United States Patent [19]

Smith et al.

[11] 3,870,321

[45] Mar. 11, 1975

[54] DISC MOUNTING ARRANGEMENT

[75] Inventors: Colin Howard Stanwell Smith; Alexander Bennett Gosling; Donald George Buchanan, all of London, England

[73] Assignee: Decca Limited, London, England

[22] Filed: Aug. 1, 1973

[21] Appl. No.: 384,637

[30] Foreign Application Priority Data

Aug. 9, 1972 Great Britain .................... 37208/72

[52] U.S. Cl. .............. 274/39 A, 74/202, 178/6.7 A, 178/6.7 R, 179/100.3 Y

[51] Int. Cl. ............................................ G11b 3/60

[58] Field of Search .......................... 64/28 R, 30 R; 179/100.3 V, 100.4 R; 360/86, 97; 178/6.7 A, 6.7 R; 274/39 A, 39 R; 74/202

[56] References Cited

UNITED STATES PATENTS

| | | | |
|---|---|---|---|
| 1,967,882 | 7/1934 | Hammond, Jr. | 179/100.3 V |
| 2,986,024 | 5/1961 | Power | 64/28 R |
| 3,049,898 | 8/1962 | Voth | 64/28 R |
| 3,382,684 | 5/1968 | Fahrenholz | 64/30 R |
| 3,409,746 | 11/1968 | Skov et al. | 360/97 |
| 3,720,415 | 3/1973 | Daniels et al. | 274/39 A |
| 3,729,201 | 4/1973 | Dollenmayer | 274/39 A |
| 3,767,865 | 10/1973 | Schuller et al. | 179/100.4 R |

*Primary Examiner*—Samuel Scott
*Assistant Examiner*—Allan R. Burke
*Attorney, Agent, or Firm*—Edward F. Connors

[57] ABSTRACT

A rotary assembly comprising in combination a drive member which is rotatable about an axis and a driven member which is rotatable by the drive member about said axis by means of a balanced three-point kinematic support, wherein the support consists of three parts each consisting of a ridged projection on one of the members and a complementary notched region in the other member, two of the said notched regions are disposed on a circle centred on the said axis and the third notched region is directed radially with respect to the said axis.

6 Claims, 4 Drawing Figures

DISC MOUNTING ARRANGEMENT

This invention relates to disc mounting arrangements and particularly to arrangements by which a rotatable disc is mounted without clamps very accurately for rotation in a single plane about an axis normal to that plane.

The present invention is particularly though not exclusively intended as an adjunct to the recording of signals, particularly television signals, by means of the formation of a spatially modulated groove in the surface of a thermoplastic film. The method of recording in this manner conveniently comprises directing a beam of electrons, modulated in accord with a signal, preferably a frequency modulated signal, to be recorded so as to deposit a track of charge on the thermoplastic film. The film may be heated either before or after the deposition of charge and by means of electrostatic attraction between the deposited charge and a conductive substrate the modulation of the input signal is converted into a spatial modulation of a groove. It is necessary to control the inpingement of the beam on the film by for example oscillation transverse the track in order to produce a groove of appropriate shape.

In order to provide a substantial playing time of a record made in this manner or a disc recording made using the thermoplastic film as a master, the groove formed in the surface of the film is preferably a spiral. In order to achieve accuracy of recording the film and accordingly the support that carries it need rotation and simultaneous translation in a closely controlled manner. The present invention is particularly intended to facilitate the accurate rotation of the film in a closely defined plane about an axis normal thereto.

A disc constituting a support for a thin thermoplastic film in such a method must accordingly be mounted so that a flat surface thereof is square to the axis of rotation and the axis of rotation remains fixed. Preferably there is a feature which provides a datum centred on the rotary axis and which can be preserved. The preservation of this datum is appropriate when for example copies are made from the master recording constituted by the thermoplastic film and the punching out of a hole in a copy must be accurately centred, for example to better than plus or minus twenty five micro metres on the spiral that the groove follows.

It is desirable, but not necessarily essential, that the disc can be easily deposited on a driving support from for example a cassette from outside a vacuum chamber in which the recording process may be performed.

According to the invention there is provided a rotary assembly comprising in combination a drive member which is rotatable about an axis and a driven member which is rotatable by the drive member about said axis by means of a balanced three point kinematic support, wherein the support consists of three parts each consisting of a ridged projection on one of the members and a complementary notched region in the other member, two of the said notched regions are disposed on a circle centered on the said axis and the third notched region is directed radially with respect to the said axis. Preferably the first two notched regions are symmetrically disposed with respect to the third notched region.

The said two notched regions may form parts of a circular groove which is preferably formed in the driven member. The third notched region may likewise be formed in the driven member and the ridged projections may project from the rotary drive member.

Normally the driven member would be a plate-like member such as a disc. Preferably the driven member has a flat upper surface which the support causes to lie in a plane normal to the said axis. In such a case and for use in the method hereinbefore described, a thermoplastic film would be disposed on the side of the disc remote from the supports.

Reference will hereinafter be made to the accompanying drawings of which:

Figure 1:
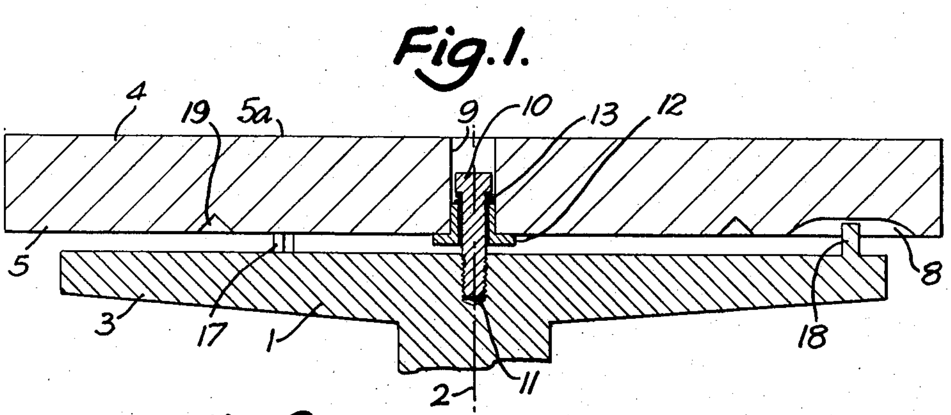
FIG. 1 is a sectional view of an assembly of a drive member and a driven member in accord with the invention.

In the drawings is shown a rotary head 1 which can be driven by a suitable motor about a central axis 2. The head 1 has an outer surface 3 which is substantially flat and is square to the axis 2. A disc 4 rests on the head 1 in use and is driven by the head of means of a three point, balanced kinematic support which will be described. The disc 4, constituting the driven member, has in use its undersurface 5 adjacent the surface 3 of the head 1. The purpose of the arrangement described is to drive the flat upper surface **5*a* of the disc 4 accurately about the axis 2** in a unique plane of rotation.

Figure 2:
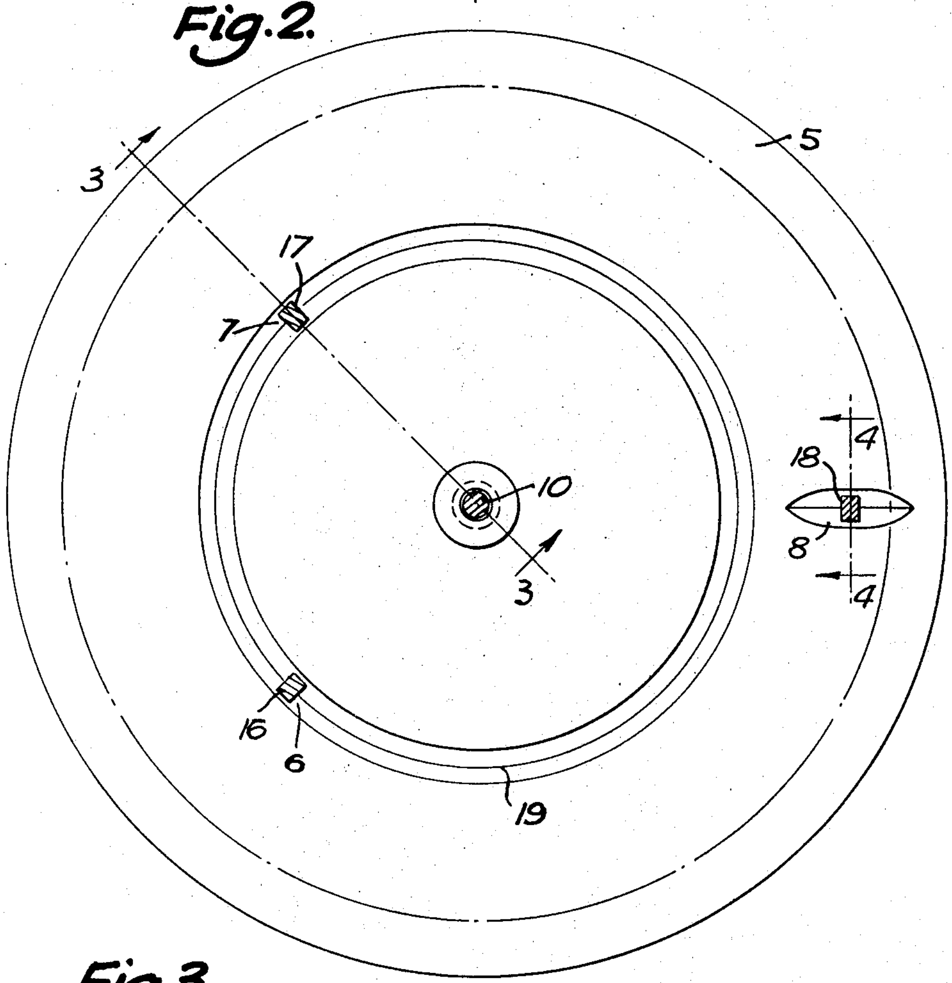
FIG. 2 is a partly sectioned plan view of the assembly of FIG. 1.
Figure 3:
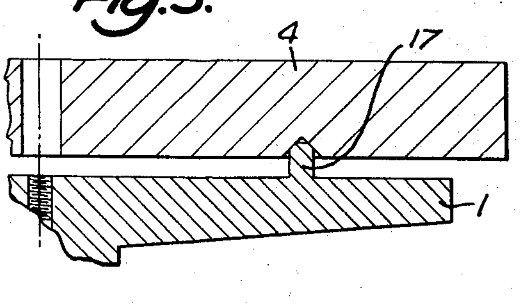
FIG. 3 is a part sectional view along the line 3—3 in FIG. 2.
Figure 4:
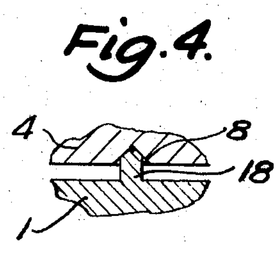
FIG. 4 is a scrap section along the central region of the line 4—4 in FIG. 2.

The kinematic support is constituted by three ridged projections and three corresponding notched regions. In the present embodiment the three projections 16, 17 and 18 are all provided as ridge projections from the surface 3 of the rotary head 1 and notched regions 6, 7 and 8 are provided in the undersurface of the rotary disc-like member 4. As is most clearly shown in FIG. 2, the notched regions 6 and 7 associated with projections 16 and 17 each form a part of a circular groove 19 in the underside of the disc 4. The projections 16, 17 each fit snugly into the notched regions 6, 7 respectively and thereby radial movement of the disc 4 relative to the head 1 is precluded. The third notched region 8 is directed radially with respect to the axis 2 and has a width whereby the projection 18 fits snugly into the notch 8 and hence precludes rotational movement of the disc 4 relative to the head. The arrangement is balanced so that the bisector of the angle between lines passing longitudinally through the centre of each of the regions 6 and 7 associated with the ridges 16 and 17 is directed along the line of the notched region 8. It will thereby be appreciated that the arrangement of the projection and notches will transmit a rotational drive from the head 1 to the disc 4.

Additionally this three point kinematic support is sufficient to constrain, without the use of clamps, the disc 4 to rotate accurately under the influence of contact with the rotary head without rotation relative thereto. The disc is provided with a central hole 9, which serves as the aforementioned datum, and in which fits loosely the head of a screw 10 which screws into a blind thread 11 in the outer surface of the head 1. A flanged collar 12 fits into the inner end of the central hole of the disc and a helical compression spring 13 is located between the collar and the head of the screw in order to retain the disc lightly on the head; this arrangement does not act as one of the constraints on the movement of the disc with respect to the head.

We claim:

1. A rotary assembly comprising in combination a drive member which is rotatable about an axis and a driven member which is rotatable by the drive member about said axis by means of a balanced three-point kinematic support, wherein the support consists of three parts each consisting of a ridged projection on one of the members and a complementary notched region in the other member, two of the said notched regions are disposed on a circle centred on the said axis and the third notched region is directed radially with respect to the said axis.

2. An assembly according to claim 1 in which the said two notched regions are symmetrically disposed with respect to the third notched region.

3. An assembly according to claim 1 in which the said two notched regions form parts of a circular groove.

4. An assembly according to claim 3 in which the groove and the third notched region are formed in the driven member and the ridged projections project from the drive member.

5. An assembly according to claim 4 in which the driven member comprises a flat upper surface which the support causes to lie in a plane normal to the said axis.

6. An assembly according to claim 5 in which the driven member has a central axial hole in which a screw, which is secured to the drive member, fits loosely to retain the driven member on the drive member without rigidly constraining the movement of the driven member with respect to the drive member.

* * * * *